United States Patent
Emelyanov et al.

(10) Patent No.: US 9,348,819 B1
(45) Date of Patent: May 24, 2016

(54) METHOD AND SYSTEM FOR FILE DATA MANAGEMENT IN VIRTUAL ENVIRONMENT

(71) Applicants: Pavel Emelyanov, Moscow (RU); Kirill Korotaev, Moscow (RU)

(72) Inventors: Pavel Emelyanov, Moscow (RU); Kirill Korotaev, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 3 days.

(21) Appl. No.: 13/724,882

(22) Filed: Dec. 21, 2012

Related U.S. Application Data

(60) Provisional application No. 61/582,291, filed on Dec. 31, 2011.

(51) Int. Cl.
| | |
|---|---|
| *G06F 7/00* | (2006.01) |
| *G06F 17/00* | (2006.01) |
| *G06F 12/00* | (2006.01) |
| *G06F 17/30* | (2006.01) |
| G06F 12/02 | (2006.01) |
| G06F 3/06 | (2006.01) |
| G06F 12/10 | (2016.01) |

(52) U.S. Cl.
CPC .......... *G06F 17/30008* (2013.01); *G06F 3/067* (2013.01); *G06F 12/023* (2013.01); *G06F 12/109* (2013.01)

(58) Field of Classification Search
CPC .............. G06F 11/1464; G06F 3/0605; G06F 11/1451; G06F 17/30011; G06F 17/30563; G06F 9/45533; G06F 9/45558; G06F 2009/45579; G06F 2009/45583; G06F 12/104
USPC .............. 707/667; 711/6, 161, 162, 170, 171, 711/202, 203, 209
See application file for complete search history.

(56) References Cited

U.S. PATENT DOCUMENTS

| | | | | |
|---|---|---|---|---|
| 5,581,724 A | * | 12/1996 | Belsan et al. | 711/114 |
| 7,702,843 B1 | * | 4/2010 | Chen et al. | 711/6 |
| 7,716,446 B1 | * | 5/2010 | Chen et al. | 711/170 |
| 7,925,850 B1 | * | 4/2011 | Waldspurger et al. | 711/162 |
| 8,166,267 B2 | * | 4/2012 | Sinclair | G06F 12/0246 711/103 |
| 8,959,305 B1 | * | 2/2015 | Lecrone | G06F 12/023 707/813 |
| 2003/0221095 A1 | * | 11/2003 | Gaunt | G06F 11/1417 713/1 |
| 2004/0268022 A1 | * | 12/2004 | Shieh | 711/103 |

(Continued)

OTHER PUBLICATIONS

Gallard et al., "Is Virtualization Killing Single System Image Research?" Research Report, RR-6389, INRIA, 2007, http://hal.inria.fr/inria-00196717v3.*

(Continued)

*Primary Examiner* — Augustine K Obisesan
*Assistant Examiner* — Lin Lin Htay
(74) *Attorney, Agent, or Firm* — Bardmesser Law Group

(57) ABSTRACT

A method and system for archiving file data used by a virtual container. The container uses "real files" and "balloon" files. The "real files" are the container file system files that are mapped to corresponding blocks of the host file system. The "real files" are mapped upon creation. The "balloon" files are also created in the container file system, but any links to the blocks of the host file system are invalidated (mapping is removed) and the blocks of the host file system corresponding to a balloon file are marked as free. A hypervisor, a host OS or a Virtual Machine Monitor frees up real physical blocks completely, so these blocks become available for writes in the host file system. Thus, all references indicating that these blocks are occupied are removed.

9 Claims, 6 Drawing Sheets

(56) References Cited

U.S. PATENT DOCUMENTS

| | | | |
|---|---|---|---|
| 2005/0055603 A1* | 3/2005 | Soran et al. | 714/7 |
| 2006/0020745 A1* | 1/2006 | Conley et al. | 711/103 |
| 2006/0224846 A1* | 10/2006 | Amarendran et al. | 711/162 |
| 2008/0172427 A1* | 7/2008 | Ito | 707/205 |
| 2008/0320061 A1* | 12/2008 | Aszmann et al. | 707/205 |
| 2009/0025006 A1* | 1/2009 | Waldspurger | G06G 9/5016 718/104 |
| 2009/0172300 A1* | 7/2009 | Busch | 711/147 |
| 2009/0228629 A1* | 9/2009 | Gebhart | G06F 8/63 711/6 |
| 2009/0271589 A1* | 10/2009 | Karpoff et al. | 711/170 |
| 2009/0307686 A1* | 12/2009 | Hepkin | 718/1 |
| 2010/0017800 A1* | 1/2010 | Dow et al. | 718/1 |
| 2010/0070725 A1* | 3/2010 | Prahlad et al. | 711/162 |
| 2010/0241785 A1* | 9/2010 | Chen et al. | 711/6 |
| 2011/0125951 A1* | 5/2011 | Youngworth | 711/6 |
| 2011/0138147 A1* | 6/2011 | Knowles et al. | 711/170 |
| 2012/0110293 A1* | 5/2012 | Yang et al. | 711/170 |
| 2012/0173822 A1* | 7/2012 | Testardi et al. | 711/135 |
| 2012/0331242 A1* | 12/2012 | Shaikh et al. | 711/154 |
| 2013/0031291 A1* | 1/2013 | Edwards | G06F 21/554 711/6 |
| 2013/0117494 A1* | 5/2013 | Hughes | G06F 9/5077 711/6 |
| 2013/0185480 A1* | 7/2013 | Newell | G06F 12/023 711/103 |
| 2015/0113202 A1* | 4/2015 | McDougall | G06F 12/023 711/6 |

OTHER PUBLICATIONS

Liu et al., "Optimize Performance of Virtual Machine Checkpointing via Memory Exclusion," Fourth ChinaGrid Annual Conference, IEEE, Computer Society, 2009.*

Schopp et al., "Resizing Memory with Balloons and Hotplug" Proceedings of the Linux Symposium, vol. Two, Jul. 2006, Ottawa, Ontario Canada.*

VMWare, "Understanding Memory Resource Management in VMware ESX Server," VMware, Inc. 2009.*

* cited by examiner

METHOD AND SYSTEM FOR FILE DATA MANAGEMENT IN VIRTUAL ENVIRONMENT

CROSS-REFERENCE TO RELATED APPLICATION

This application claims priority to the U.S. Provisional Patent Application No. 61/582,291 filed on Dec. 31, 2011, incorporated herein by reference in its entirety.

BACKGROUND OF THE INVENTION

1. Field of the Invention

The present invention relates to archiving of data, and more particularly, to fast archiving of file data in virtual environment.

2. Description of the Related Art

Currently, there are a number of conventional methods that relate to organization of data archiving. One of these methods is a backup of the entire hard drive, which typically involves copying of the hard drive content onto some other medium, such as another hard disk drive, a DVD ROM, a DVD RAM, a flash disk, etc. The primary disadvantage of such method is the need to backup a very large amount of data.

Furthermore, in terms of virtualization the situation becomes complicated. When a file is created on a virtual disk of a Virtual Environment (VE)—a container or a Virtual Machine, the file data is stored on a real disk of a host system. A driver of the virtual disk defines correspondence between the file blocks and blocks (or clusters) of the virtual disk space. When the file is deleted, the virtual space within the VE is freed up. However, the correspondence between the virtual blocks and the real blocks is maintained, because the file is deleted from the Guest OS by standard means (for example, by deleting file records from a Guest file system table).

System resources are always limited, and freeing up real disk space from blocks occupied by the empty blocks of the Guest file system become critical. However, some of the empty blocks are not mapped in the host file system. Thus, all empty blocks of the guest file system have to be scanned in order to determine and terminate their links to the real blocks. This process overloads computation capacities of the host system where the VE runs.

A solution to the above describe problem is partially addressed by the "fallocate" function (also available in MS WINDOWS™ 2000 and later). The "fallocate" operation allows applications to ask the system kernel for a continuous space in the file system in order to avoid fragmentation. However, the "fallocate" system operation is not effective in many instances, because the operation has to be executed at the file system level.

Accordingly, there is a need in the art for an effective and efficient method of archiving file data in a virtual environment that reduces the virtual drive space.

SUMMARY OF THE INVENTION

The present invention is related to a method and system for efficient data archiving in virtual environment. In one aspect, there is provided a method for archiving file data used by a virtual container. The container uses "real files" and "balloon" files. The "real files" are the container file system files that are mapped to corresponding blocks of the host file system. The "real files" are mapped upon creation. The "balloon" files are also created in the container file system, but any links to the blocks of the host file system are invalidated (mapping is removed) and the blocks of the host file system corresponding to a balloon file are marked as free.

A non-zero length file is created and allocated for the needs of the file system. After the allocation, the file space is marked in the map of the Guest file system (or a container file system) as occupied, and is unavailable. A Guest system map reflects used blocks (real or virtual clusters) allocated for the file. A hypervisor, a host OS or a Virtual Machine Monitor (VMM) frees up real physical blocks completely, so these blocks become available for writes in the host file system. Thus, all references indicating that these blocks are occupied are removed.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Figure 1:
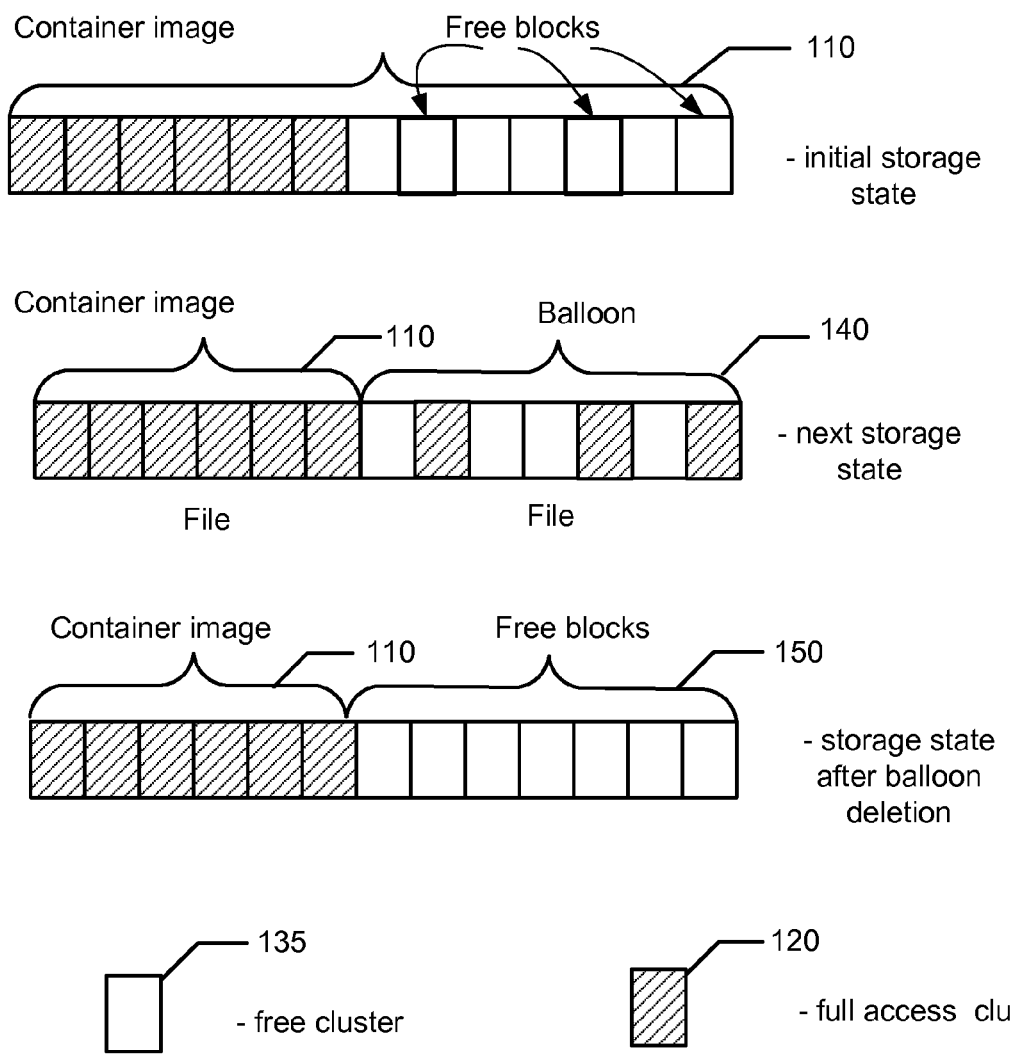
FIG. 1 illustrates a diagram of file image compression (compacting) using a balloon file, in accordance with the exemplary embodiment.

Reference will now be made in detail to the embodiments of the present invention, examples of which are illustrated in the accompanying drawings.

A method, system and computer program product for archiving file data used by a virtual container is provided. According to an exemplary embodiment, the container (or a Guest OS, in case of the VM) uses "real files" and "balloon" files. The "real files" are the Guest file system files that are mapped to corresponding blocks of the host file system. The "real files" are mapped upon creation. The "balloon" files are also created in the container or the Guest file system, but any links to the blocks of the host file system are invalidated (i.e., mapping is removed) and the blocks of the host file system corresponding to the balloon file are marked as free.

According to the exemplary embodiment, a non-zero length balloon file is created and allocated for needs of the file system. After the allocation, the file space is automatically marked in the map as occupied in the Guest file system, and is unavailable. A Guest system map reflects the used blocks (i.e., real or virtual clusters) allocated for the file. The virtual clusters are the images of the real clusters located on the host file system. Then, a Hypervisor, a host OS or a Virtual Machine Monitor frees up the corresponding real physical blocks completely, so that these blocks become available for writes in the host file system. Thus, all references indicating that these blocks are occupied are removed.

According to one exemplary embodiment, when a request for a free space on the virtual disk within the container or the Guest OS is received, a virtual parameter is returned. The virtual parameter equals the virtual disk size minus the size of the balloon file. For example, if the original size of the virtual disk is 8 Gb and it should be 6 Gb, the balloon file is inflated by 2 Gb on this disk. When a container requests the size of that disk, the reported value would be real disk size minus balloon file size, that is, 8 Gb-2 Gb, which is 6 Gb, i.e., what was required. The reported parameter is treated by container as its disk size, i.e. the amount of space available to store the container's data. If a user wants to reduce the size of the file system to the size of the balloon file, the movement of the blocks of the balloon file is prohibited. In this case, the balloon file can only be used for virtual read and delete operations, but not for the writes.

In one exemplary embodiment, the balloon file can be used when the blocks of the Guest file system are used randomly, for example, when the system performs writes into continuous chains of virtual clusters (for improved productivity). When the balloon file is created, it occupies a part of the container/Guest file system space and forces the system to write into the blocks that already have the corresponding blocks on the real disk. Thus, the uncontrollable growth of the file image is prevented.

In this case, the size of the balloon file can change dynamically. For example, the size of the balloon can be reduced after the "disk is full" command is generated. According to the exemplary embodiment, the blocks of the balloon file do not have corresponding blocks on the real disk. This works especially well within containers, since the containers share services of the same OS. For example, if the Guest OS stresses its disk with creating and removing a lot of files randomly, the file system will try to allocate new files in new places of the disk, even if there will be enough free space on old places after some files, created previously, are removed. This load on the disk will lead to virtual disk occupy too much space on real disk, as the Guest OS's file system will constantly request new blocks on the virtual disk. To prevent this behavior, a balloon file can be inflated with the size of (for example) half of the disk size. In this case the Guest OS's file system will have to store files only on half of the disk, thus preventing the disk image from growing. If there is enough space for workload, the size of the balloon should be automatically decreased.

Since the containers share a single instance of the OS, performing modification of a file system driver only once is sufficient. A driver of a file system that resides on containers' disks is loaded into the host OS, thus to provide the ballooning feature to all containers on the node, it is only necessary to modify the host's file system driver. Thus, the existence of the balloon file is hidden from the containers. In case of the VM, this is more difficult. The VM can actually erase the balloon file at its own risk. The VM, however, can "know" of the existence of the balloon file, since the VM can read the disk through its own mechanisms and/or drivers (not through the driver of the OS). Note that the balloon resides on the file system, not on disk. Thus, the balloon (with the file system) is not hardware level entity.

The balloon file can be used to identify unused blocks of the file system, without considering how exactly the file system maps its files to the disk. According to the exemplary embodiment, a special procedure for checking the mapping of the file blocks of the container to the blocks of the real disk is implemented. Generally speaking, when a file is created inside the container, the corresponding blocks of the real disk are allocated for storage of the content of the file. When a balloon file is inflated, the file system driver treats this balloon as a regular file and locates it in unused blocks. After the balloon is inflated, we can request the file system to identify which blocks the created files occupy and report to the virtual disk driver on host, that the blocks in question will not contain any guest data and thus can be removed from the physical medium.

According to one exemplary embodiment, when a balloon file is created, additional blocks are not allocated. Instead, only the blocks shown as free inside the container and allocated to the disk image or disk file of the container are used. The system deletes from a bitmap the references pointing to the real disk blocks that store image content. The image of the file or the image of the container disk is edited accordingly. The editing of the image depends on the image logic. The image bitmap reflects free or used block is revised. Then, free blocks can be deleted from the volume of the image file or other types of image containers, e.g., a compressed disk.

After all blocks of the balloon file are deleted from the image of the container disk, the balloon file is deleted from the container file system. Alternatively, un-mapping of the blocks occurs during the process of the balloon creation (i.e., a reverse operation to file creation on the disk image is performed).

According to the exemplary embodiment, use of the balloon file allows to reduce (or compact) the virtual disk space. The balloon file occupies all the free space. The used blocks are moved and the size of the balloon file is reduced. Then, the balloon file is deleted after the compacting process is completed. In other words, compacting and defragmentation is performed on portions of the balloon file. This relates to the ability of the balloon file to detect free blocks of the Guest file system. The balloon is inflated the system checks which blocks are unused, removes them from the image file, then removes the balloon file back. This allows removing unused blocks without having to know how the file system, used in the Guest OS, works.

For example, the balloon file can include all free blocks, available at the moment and not used by the Guest OS or by the containers, that the OS file system driver is aware of. These blocks can then be marked as belonging to the balloon file, while all the other blocks are used by the OS file system by definition.

According to the exemplary embodiment, the Guest/container system receives space for writes after the balloon is completely removed. Note that removal of parts of the balloon allows for reduction of the virtual disk space quota (for a VM or a container) on-the-fly, without stopping the container". In case of failure in the process of the balloon file creation, the system can use an old image of the file system. In one embodiment, the old archived blocks are saved, when the blocks are moved into the balloon file. Since balloon file creation is performed by the file system driver, the latter takes care of keeping the information to ensure the balloon file is consistent in case of crashes. This is done differently by different file systems. Use of the balloon file creates an illusion for the Guest OS or the container that its disk space has been reduced.

FIG. 1 illustrates a diagram of file image compression (compacting) using a balloon file, in accordance with the exemplary embodiment. A virtual container runs on a host computer system. An initial image of the container 110 on a virtual disk has full access clusters 120 and free clusters 135. Then, in the next state, the portion of the container image 110 is taken by a balloon file 140. The balloon file 140 is populated by the free clusters 135 and full access clusters 120.

Subsequently, defragmentation is performed, and the full access clusters 120 are moved to from the balloon file 140 to the container 110. As a result, the balloon file 140 is completely freed up. Then, the balloon file 140 is deleted and the container 110 receives free blocks 150.

Figure 2A:
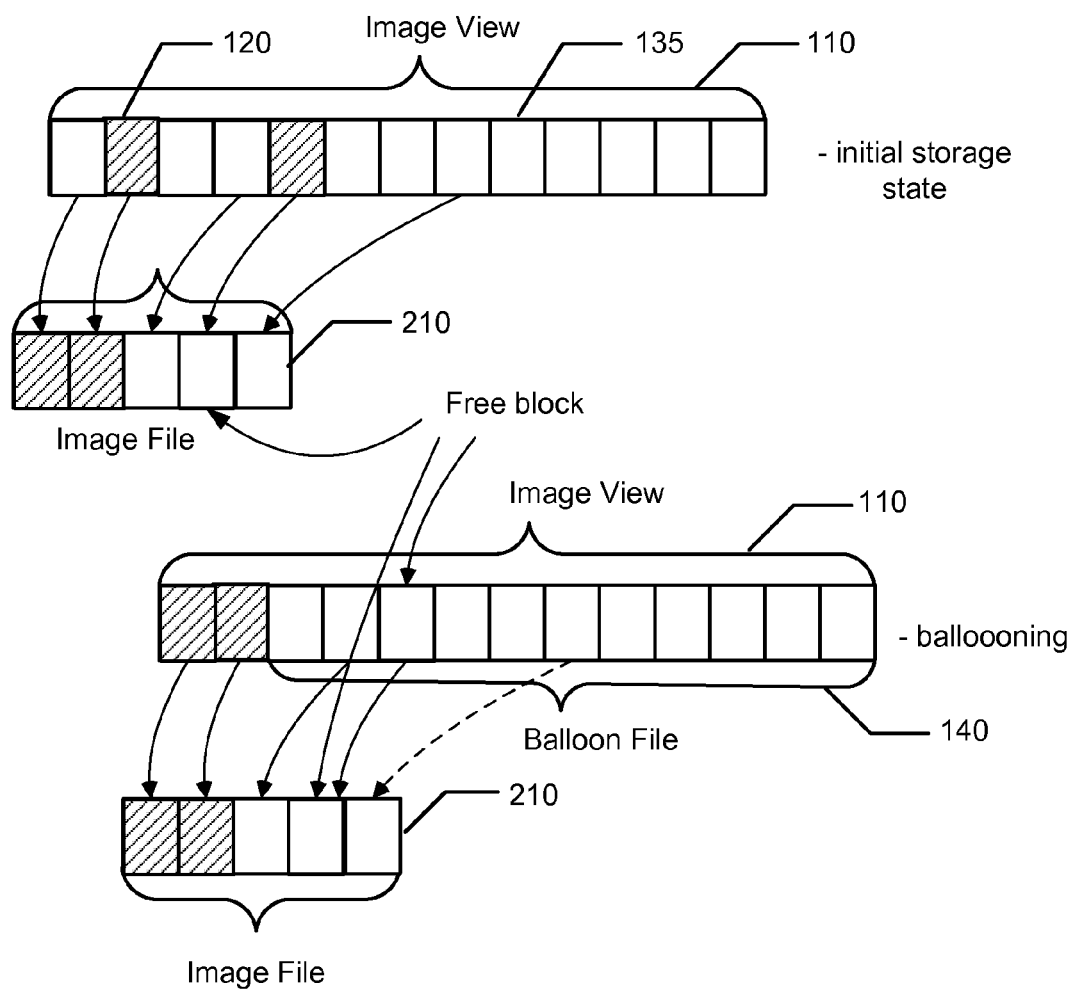
FIG. 2A illustrates compacting of a container image when balloon file is created over free mapped blocks of the container.

FIG. 2A illustrates compacting of a container image when balloon file is created over free mapped blocks of the container, according with the exemplary embodiment. An initial image of the container 110 on a virtual disk has full access clusters 120 and free clusters 135. The actual image file 210 includes the free clusters 135 and full access clusters 120 of the image view. Note that operations can be done on a block basis, or on a cluster basis.

The Unix communities employ the term block to refer to a sector or group of sectors. For example, the Linux fdisk utility normally displays partition table information using 1024-byte blocks, but also uses the word sector to help describe a disk's size in the phrase, 63 sectors per track.

Clusters are allocation units for data on various file systems (FAT, NTFS, etc.), where data mainly consists of files. Clusters are not directly affected by the physical or virtual geometry of the disk, i.e., a cluster can begin at a sector near the end of a given CH track, and end in a sector on the physically or logically next CH track.

Then, the free clusters of the image view 110 are moved into the balloon file 140.

Subsequently, some of the corresponding free clusters from the image file 210 are provided from the balloon file 140. However, once the balloon file 140 is discarded, the actual image file of the container 110 is reduced by the space occupied by the free clusters of the balloon file. Thus, the container image is compacted.

Figure 2B:
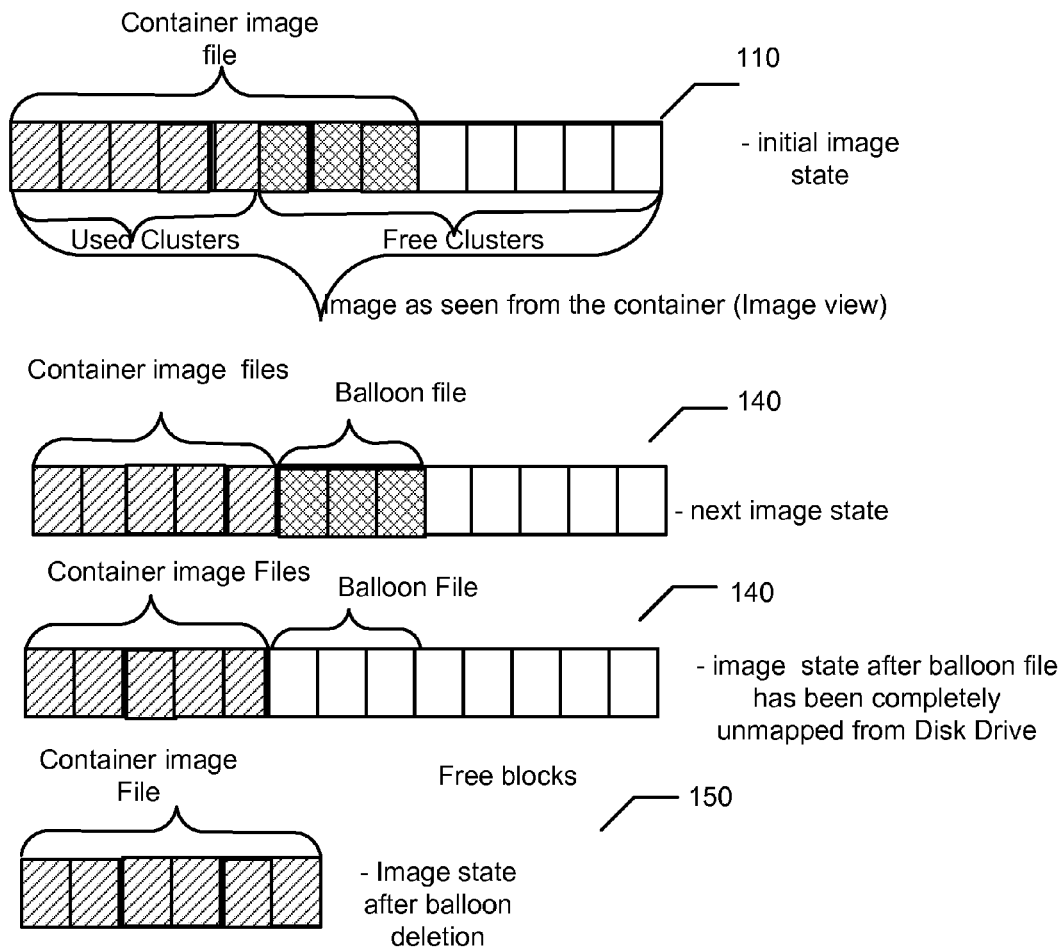
FIG. 2B illustrates another embodiment of compacting of a container image when balloon file is created over free mapped blocks of the container.

FIG. 2B illustrates compacting of a container image when balloon file is created over free mapped (onto the real disk) blocks of the container, according to the exemplary embodiment. An initial image of the Container 110 on a virtual disk has full access clusters 120 and free clusters 135. The actual image file 210 includes the free clusters 135 and full access clusters 120 of the image view.

Then, the free clusters of the image view 110 are moved into the balloon file 140. Then, some of the corresponding free clusters from the image file 210 are provided from the balloon file 140. However, once the balloon file 140 is discarded, the actual image file of the Container 110 is reduced by the space occupied by the free clusters of the balloon file. Thus, the Container image is compacted.

Figure 3:
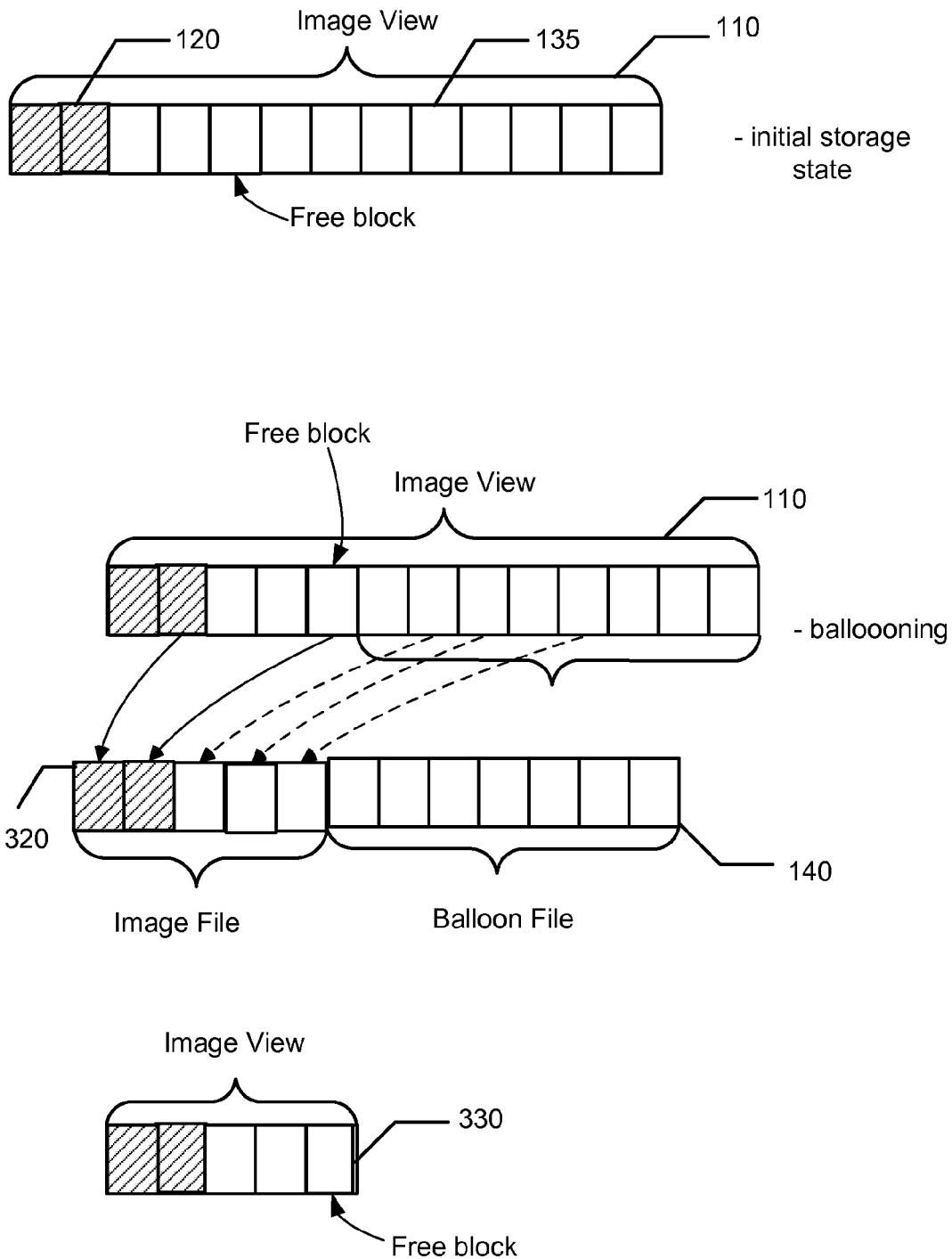
FIG. 3 illustrates compacting of the container image when ballooning is used for reducing disk quota only and balloon file is created over mapped and unmapped blocks of the container disk image.

FIG. 3 illustrates compacting of the container image when ballooning is used for reducing disk quota only and balloon file is created over mapped and unmapped blocks of the container disk image, according to the exemplary embodiment. An initial image of the container 110 on a virtual disk has full access clusters 120 and free clusters 135. The actual image file 320 includes the free clusters 135 and full access clusters 120 of the image view written sequentially so that the free clusters are written after the used clusters. Then, the free clusters of the image view 110 are moved into the balloon file 140.

Subsequently, some of the corresponding free clusters or blocks from the image file 320 are provided from the balloon file 140. The resulting balloon file 140 occupies free clusters of the container image 330. However, once the balloon file 140 is discarded, the actual image file of the container 110 is reduced by the space occupied by the free clusters of the balloon file 140. Thus, the container image is greatly compacted. The balloon file indicates where the free blocks of the container are located.

When a file is created inside the container, the specific procedure maps and re-maps portions of the file to specific cluster(s) of the hard drive. When a balloon file is created, the same procedure checks if the block required for mapping belongs to the container, and un-maps it. If the block is free, no action is taken. Corresponding space is unavailable for container's procedures, and the host OS can manipulate it in a secure manner until the end of the procedure of the balloon creation.

Figure 4:
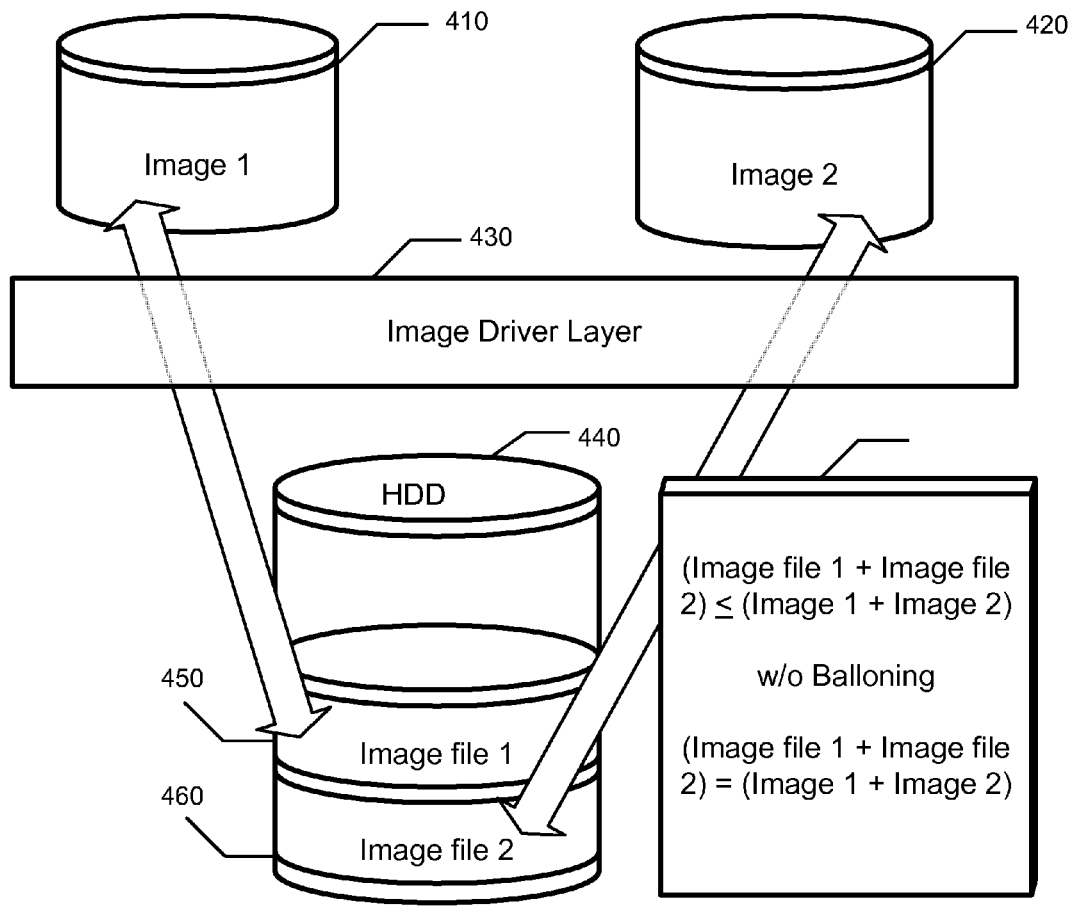
FIG. 4 is a schematic architecture of data archiving system, in accordance with the exemplary embodiment.

FIG. 4 illustrates a schematic architecture of a data archiving system, in accordance with the exemplary embodiment. An exemplary hard disk drive 440 has real images of files (files 1 and 2) 450 and 460. These images have corresponding images (1 and 2) 410 and 420 on a virtual disk of the container. An image driver layer 430 provides balloon processing between the real files 450 and 460 and the virtual images 410 and 420. The image driver layer is a virtual disk driver that takes a file from physical storage and creates a virtual block device in the system, whose data is put into the created image file. The job of the virtual disk driver is to establish mapping between virtual disk block and offsets in the image file. For optimization, the virtual disk driver sometimes may establish additional mapping between the image file offset and the physical disk block and thus redirect virtual disk blocks directly to physical disk block. The balloon file processing reduces the size of the virtual images 410 and 420 in such a way that:

(Image file 1+Image file 2)<(Image 1=Image 2). The image is the quota allocated to the container. If a balloon file is not used, the size of the image becomes the size of the quota. In other words, without the ballooning process, these images are equal in size. When the balloon file is used, the unused blocks of the image can be identified, and the size of the image file can be reduced, which is transparent to the guest/container.

Note that, if an image file is smaller than the quota, the balloon is created for the quota. For example, if the container sees 100 free clusters, while the image occupies only 50, the balloon file is created for 100 clusters.

Figure 5:
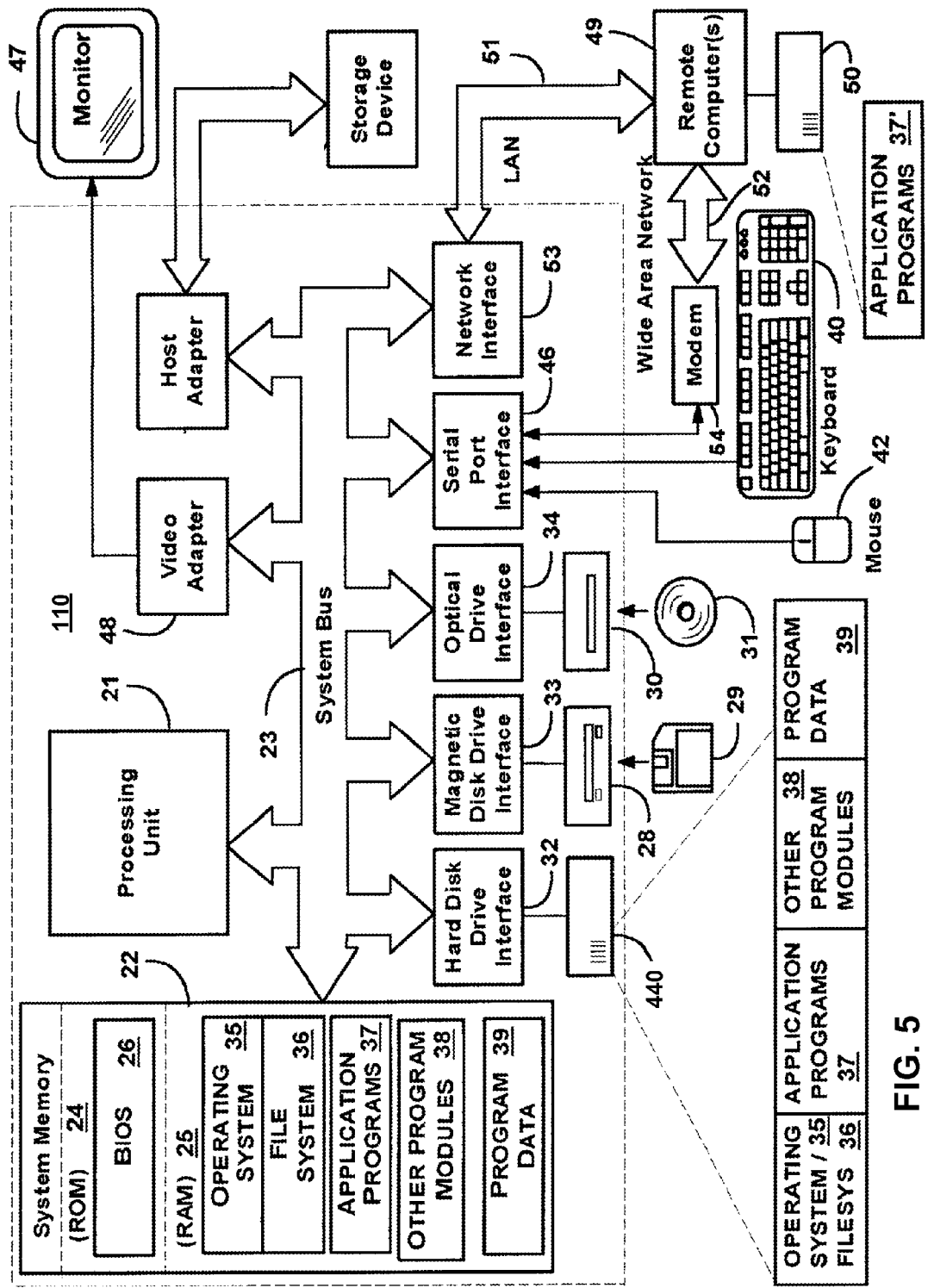
FIG. 5 illustrates a schematic diagram of an exemplary computer or server that can be used in the invention.

With reference to FIG. 5, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the personal computer 20, such as during start-up, is stored in ROM 24. The personal computer 20 may further include a hard disk drive 440 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 440, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably WINDOWS™ 2000). The computer 20 includes a file system 36 associated with or included within the operating system 35, such as the WINDOWS NT™ File System (NTFS), one or more application programs 37, other program modules 38 and program data 39. A user may enter commands and information into the personal computer 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other peripheral output devices (not shown), such as speakers and printers. A data storage device, such as a hard disk drive, a magnetic tape, or other type of storage device is also connected to the system bus 23 via an interface, such as a host adapter via a connection interface, such as Integrated Drive Electronics (IDE), Advanced Technology Attachment (ATA), Ultra ATA, Small Computer System Interface (SCSI), SATA, Serial SCSI and the like.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the computer 20.

The computer 20 may further include a memory storage device 50. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46.

In a networked environment, program modules depicted relative to the personal computer 20, or portions thereof, may be stored in the remote memory storage device. It will be appreciated that the network connections shown are exemplary and other means of establishing a communications link between the computers may be used.

Having thus described the different embodiments of a system and method, it should be apparent to those skilled in the art that certain advantages of the described method and apparatus have been achieved. In particular, it should be appreciated by those skilled in the art that the method and system for Guest system/container data archiving described in the exemplary embodiments significantly reduces the computational burden and associated costs, while increases the overall efficiency of data management.

It should also be appreciated that various modifications, adaptations, and alternative embodiments thereof may be made within the scope and spirit of the present invention. The invention is further defined by the following claims.

What is claimed is:

1. A computer-implemented method for archiving data in virtual containers, the method comprising:
   launching a plurality of virtual containers on a host computer system having a single instance of a host operating system (OS), the host OS having a host file system containing real data clusters allocated for storing content of virtual data clusters of the virtual containers, wherein the virtual containers share the single instance of the host OS and execute applications within them;
   instantiating a container file system containing the virtual data clusters;
   activating a virtual disk driver on one of the virtual containers, wherein the virtual disk driver has system-level privileges;
   generating an editable container disk image reflecting free and full access virtual data clusters, wherein a virtual driver layer provides a direct connection between a hard disk drive and the container disk image and provides reads directly from corresponding blocks on the hard disk drive without depending on the file system, and
   wherein the virtual disk driver establishes additional mapping between an offset in the container image file and physical disk block and to thereby redirect virtual disk blocks directly to physical disk blocks;
   allocating a portion of the container disk image to a balloon file containing free virtual data clusters and read-only virtual data clusters;
   mapping the read-only virtual data clusters from the balloon file to the container disk image;
   reducing the size of the container disk image file by deleting the balloon file,
   wherein the balloon file is created on the container file system and links between the real data clusters and the virtual data clusters are removed when mapping the free virtual data clusters to real data clusters such that free space on a hard disk drive is visible to all virtual containers on the host computer system.

2. The method of claim 1, wherein the full access virtual clusters are written into the container disk image file randomly.

3. The method of claim 1, wherein the full access virtual clusters are written into the container disk image file sequentially.

4. The method of claim 1, wherein the container disk image file is reduced to a size of full access data clusters.

5. The method of claim 1, wherein the reducing of the size of the container disk image file is performed on-the-fly.

6. The method of claim 1, wherein the balloon file is only used for virtual read and delete operations.

7. A system for archiving data in virtual containers, the system comprising:
- a host computer system running a host operating system (OS) having a host file system containing real data clusters allocated for storing content of virtual data clusters of the virtual containers;
- a plurality of virtual containers running on a host computer system having a single instance of the host OS, wherein the virtual containers share the single instance of the host OS and execute applications within them;
- a container file system containing virtual data clusters;
- a virtual disk driver executed on one of the virtual containers, wherein the virtual disk driver has system-level privileges;
- an editable container disk image reflecting free virtual data clusters and full access virtual data clusters,
- wherein a virtual driver layer provides a direct connection between a hard disk drive and the container disk image and provides reads directly from corresponding blocks on the hard disk drive without depending on the file system, and
- wherein the virtual disk driver establishes additional mapping between an offset in the container disk image file and physical disk block and to thereby redirect virtual disk blocks directly to physical disk blocks; and
- a balloon file generated by the virtual disk driver containing free virtual clusters and read only real data clusters, wherein:
- the read-only real data clusters are moved from the balloon file to the container disk image;
- the size of the container image file is compacted by deleting the balloon file; and
- the balloon file is created on the container file system and links between the real data clusters and the virtual data clusters are removed when mapping the free virtual data clusters to real data clusters such that free space on a hard disk drive is visible to all virtual containers running on the host computer system.

8. The system of claim 7, wherein an aggregate size of the real data clusters is smaller than an aggregate size of the virtual data clusters.

9. A system for archiving data m virtual environment, comprising:
- a processor;
- a memory;
- a computer program logic stored in the memory an executed on the processor, the computer program logic for executing the steps of
- launching a plurality of virtual containers on a host computer system having a single instance of a host operating system (OS), the host OS having a host file system containing real data clusters allocated for storing content of virtual data clusters of the virtual containers, wherein the virtual containers share the single instance of the host OS and execute applications within them;
- instantiating a container file system containing the virtual data clusters;
- activating a virtual disk driver on one of the virtual containers, wherein the virtual disk driver has system-level privileges;
- generating an editable container disk image reflecting free and full access virtual data clusters, wherein a virtual driver layer provides a direct connection between a hard disk drive and the container disk image and provides reads directly from corresponding blocks on the hard disk drive without depending on the file system, and
- wherein the virtual disk driver establishes additional mapping between an offset in the container image file and physical disk block and to thereby redirect virtual disk blocks directly to physical disk blocks;
- allocating a portion of the container disk image to a balloon file containing free virtual data clusters and read-only virtual data clusters;
- mapping the read-only virtual data clusters from the balloon file to the container disk image;
- reducing the size of the container disk image file by deleting the balloon file,
- wherein the balloon file is created on the container file system and links between the real data clusters and the virtual data clusters are removed when mapping the free virtual data clusters to real data clusters such that free space on a hard disk drive is visible to all virtual containers on the host computer system.

\* \* \* \* \*